(12) United States Patent
Wiesner et al.

(10) Patent No.: US 8,961,825 B2
(45) Date of Patent: Feb. 24, 2015

(54) FLUORESCENT SILICA NANOPARTICLES THROUGH SILICA DENSIFICATION

(75) Inventors: Ulrich B. Wiesner, Ithaca, NY (US); Erik Herz, Brookhaven, PA (US); Hooisweng Ow, Arlington, MA (US)

(73) Assignee: Cornell University, Ithaca, NY (US)

( * ) Notice: Subject to any disclaimer, the term of this patent is extended or adjusted under 35 U.S.C. 154(b) by 479 days.

(21) Appl. No.: 13/264,569

(22) PCT Filed: Apr. 15, 2010

(86) PCT No.: PCT/US2010/031294
§ 371 (c)(1),
(2), (4) Date: Apr. 27, 2012

(87) PCT Pub. No.: WO2010/121064
PCT Pub. Date: Oct. 21, 2010

(65) Prior Publication Data
US 2012/0223273 A1    Sep. 6, 2012

Related U.S. Application Data

(60) Provisional application No. 61/169,637, filed on Apr. 15, 2009, provisional application No. 61/169,609, filed on Apr. 15, 2009.

(51) Int. Cl.
*B82B 3/00*    (2006.01)
*C01B 33/18*    (2006.01)
(Continued)

(52) U.S. Cl.
CPC .............. *C09K 11/025* (2013.01); *B01J 13/18* (2013.01); *B82Y 30/00* (2013.01); *B82Y 40/00* (2013.01); *C09B 67/0007* (2013.01); *C09B 69/008* (2013.01); *C09B 69/10* (2013.01); *C01B 33/18* (2013.01); *C01P 2004/32* (2013.01); *C01P 2004/62* (2013.01); *C01P 2004/64* (2013.01);
(Continued)

(58) Field of Classification Search
USPC ............ 252/301.4 F; 428/404; 977/811, 834; 427/213.34, 213.3
See application file for complete search history.

(56) References Cited

U.S. PATENT DOCUMENTS 6,548,264 B1 * 4/2003 Tan et al. ................. 435/7.21
2003/0024277 A1   2/2003 Costa et al.
(Continued)

FOREIGN PATENT DOCUMENTS

CN   1523076 A    8/2004
WO   2004063387 A2   7/2004
(Continued)

OTHER PUBLICATIONS

Ow et al. Bright and stable core-shell fluorescent silica nanoparticles, Nano Letters, Dec. 17, 2004, Vo. 5, No. 1, pp. 113-117.
(Continued)

*Primary Examiner* — Carol M Koslow
(74) *Attorney, Agent, or Firm* — Hodgson Russ LLP (57) ABSTRACT

Provided herein are core-shell silica nanoparticles with a dense silica shell. The nanoparticles have improved properties such as, for example, increased photo luminescence and stability. Also provided are methods for making the nanoparticles.

9 Claims, 5 Drawing Sheets (51) Int. Cl.
*C09K 11/02* (2006.01)
*B01J 13/18* (2006.01)
*B82Y 30/00* (2011.01)
*B82Y 40/00* (2011.01)
*C09B 67/08* (2006.01)
*C09B 69/00* (2006.01)
*C09B 69/10* (2006.01)

(52) U.S. Cl.
CPC .......... *C01P 2004/90* (2013.01); *Y10S 977/811* (2013.01); *Y10S 977/834* (2013.01)
USPC ............ 252/301.4 F; 427/213.34; 427/213.3; 977/811; 977/834; 428/404

(56) References Cited

U.S. PATENT DOCUMENTS

| | | |
|---|---|---|
| 2003/0117691 A1 | 6/2003 | Bi et al. |
| 2003/0157330 A1 | 8/2003 | Ostafin et al. |
| 2003/0175411 A1 | 9/2003 | Kodas et al. |
| 2004/0067503 A1 | 4/2004 | Tan et al. |
| 2004/0101822 A1 | 5/2004 | Wiesner et al. |
| 2005/0264811 A1 | 12/2005 | Bi et al. |
| 2006/0183246 A1* | 8/2006 | Wiesner et al. ............... 436/524 |
| 2006/0245971 A1* | 11/2006 | Burns et al. ..................... 422/58 |
| 2007/0036705 A1 | 2/2007 | Butts et al. |
| 2007/0036736 A1 | 2/2007 | Kalla et al. |
| 2007/0104878 A1 | 5/2007 | Kodas et al. |
| 2007/0167554 A1 | 7/2007 | Ryang |
| 2008/0044830 A1 | 2/2008 | Tovar et al. |
| 2008/0173344 A1 | 7/2008 | Zhang et al. |
| 2008/0213883 A1 | 9/2008 | Davis et al. |
| 2008/0241262 A1 | 10/2008 | Lee et al. |
| 2008/0305045 A1 | 12/2008 | Kuniyil et al. |
| 2009/0108235 A1 | 4/2009 | Ando et al. |
| 2009/0148578 A1 | 6/2009 | Kondoh et al. |
| 2009/0149426 A1 | 6/2009 | Lee et al. |
| 2009/0169482 A1 | 7/2009 | Zheng et al. |
| 2009/0169892 A1 | 7/2009 | Bazzi et al. |
| 2009/0269016 A1 | 10/2009 | Korampally et al. |
| 2009/0311556 A1 | 12/2009 | Ganapathiraman et al. |
| 2010/0019188 A1 | 1/2010 | Warren et al. |
| 2010/0028559 A1 | 2/2010 | Yan et al. |
| 2010/0040862 A1 | 2/2010 | Shiba et al. |
| 2010/0072420 A1 | 3/2010 | Maruyama et al. |
| 2010/0075108 A1 | 3/2010 | Verschuuren |

FOREIGN PATENT DOCUMENTS

| | | |
|---|---|---|
| WO | 2005015213 A1 | 2/2005 |
| WO | 2006/119087 A1 | 11/2006 |
| WO | 2007017843 | 2/2007 |
| WO | 2007021508 | 2/2007 |
| WO | 2007026680 A1 | 3/2007 |

OTHER PUBLICATIONS

Lee M.H. et al. Synthesis of monodisperse fluorescent core-shell silica nanoparticles using a modified Stober method for imaging individual particles in dense colloidal suspensions, Journal of Colloid and Interface Science, Mar. 25, 2005, vol. 288, pp. 114-123.

Burns, A. et al. Fluorescent core-shell silica nanoparticles: towards "Lab on a Particle" architectures for nanobiotechnology, Chem. Soc. Reviews, Sep. 15, 2006, vol. 35, pp. 1028-1042.

Qian, D, et al. TiO2/SiO2 Core/shell structured particles: assembly and electrochemical characteristics, Chinese Journal of Inorganic Chemistry, Feb. 28, 2007, vol. 23, No. 2, pp. 305-309.

Xie, J. et al. Effect of SiO2 coating on microwave permittivity of sheet-shaped metal magnetic power, Materials Review, May 31, 2007, vol. 21, pp. 193-197.

You, X. et al. Preparation and characterization of core/shell CdTe@SiO2 luminescent composite nanoparticles, Acta Chimica Sinica, Dec. 31, 2007, vol. 65, No. 6, pp. 561-565.

Choi et al., Core-shell silica nanoparticles as fluorescent labels for nanomedicine, Journal of Biomedical Optics, vol. 12, No. 6, Dec. 28, 2007, p. 064007.

Larson et al., Silica Nanoparticle Architecture Determines Radiative Properties of Encapsulated Fluorophores, Chemistry of Materials, vol. 20, No. 8, Apr. 1, 2008, pp. 2677-2684.

Van Der Blaadern et al., Synthesis and Characterization of Colloidal Dispersions of Fluorescent, Monodisperse Silica Spheres, Langmuir, American Chemical Society, vol. 8, Aug. 10, 1992, pp. 2921-2931.

Hintz et al., Analysis of the process parameters on the growth of silica particle precipitation, 17th International Congress of Chemical and Process Engineering, Aug. 31, 2006, pp. 1-14.

* cited by examiner

| STANDARD REACTION | | | DENSIFIED REACTION | | |
|---|---|---|---|---|---|
| 0.022975 | mL TEOS per mL reaction | | 0.045475 | mL TEOS per mL reaction | |
| 22.975 | mL TEOS per L reaction | | 45.475 | mL TEOS per L reaction | |
| 0.93 | density of TEOS | | 0.93 | density of TEOS | |
| 21.36675 | grams TEOS per L reaction | | 42.29175 | grams TEOS per L reaction | |
| 0.42121521 | empirical mass conversion | | 0.42121521 | | mass conversion as calculated for standard reaction |
| 9 | grams silica produced by TEOS added to 1L (empirical) | | 17.813928 | | grams silica produced by TEOS added to 1L assuming same mass conversion |
| 1.1 | g/cc assumed density of silica | | 8.18181818 | | Assume CC stays the same so density increases |
| 8.18181818 | total calculated cc of silica | | 2.17772579 | | estimated densified particle density g/cc |

FLUORESCENT SILICA NANOPARTICLES THROUGH SILICA DENSIFICATION

CROSS-REFERENCE TO RELATED APPLICATIONS

This application claims priority to U.S. provisional patent application No. 61/169,907, filed Apr. 15, 2009, and U.S. provisional patent application No. 61/169,637, filed Apr. 15, 2009, the disclosures of which are incorporated herein by reference.

FIELD OF THE INVENTION

The present invention generally relates to silica nanoparticles with improved properties. More particularly, the present invention relates to core-shell silica nanoparticles which have a dense silica shell resulting in improved properties and methods of making them.

BACKGROUND OF THE INVENTION

There are no photoluminescent products currently available that provide a desirable level of quantum yield and have suitable chemical composition. There are quantum dots that have a high quantum yield, but they are toxic in many biological applications due to their heavy metal content, even when encapsulated in silica.

BRIEF SUMMARY OF THE INVENTION

In one aspect, the present invention provides a method for producing core-shell silica nanoparticles with improved properties. A core is produced by combining a silica precursor or silica precursors and silica precursor or silica precursors covalently bound to a light-absorbing material and/or light-emitting material (e.g., fluorescent or phosphorescent materials) (functionalized silica precursor(s)) under hydrolyzing conditions resulting in formation of a silica core. The light-absorbing material and/or light-emitting material is covalently bound to the silica network of the core. A shell encapsulating the core is formed by adding silica precursor or precursors at a temperature of at least 50° C., under conditions such that formation of new silica nanoparticles is not observed. In one embodiment, the core-shell silica nanoparticles exhibit a density of at least 1.4 g/cm³. In another embodiment, the silica precursor is TEOS and/or TMOS.

In one embodiment, during formation of the silica shell the silica precursors are added in the form of at least 10 serial aliquots of silica precursor at a temperature of at least 50° C. over a period of at least 1 hour, wherein the time between additions of consecutive aliquots is at least 6 minutes.

In one embodiment, the silica core has a diameter of from 1 to 300 nanometers. In another embodiment, the silica shell has a thickness of from 1 to 300 nanometers. In another embodiment, the core-shell silica nanoparticle has a diameter of from 1.1 to 1000 nanometers.

In another aspect, the present invention provides a method for producing core-shell silica nanoparticles with improved properties. A core is produced by combining a silica precursor or silica precursors and silica precursor or silica precursors covalently bound to a light-absorbing material and/or light-emitting material (e.g., fluorescent or phosphorescent materials) (functionalized silica precursor(s)) under hydrolyzing conditions resulting in formation of a silica core. The light-absorbing material and/or light-emitting material is covalently bound to the silica network of the core. The silica shell encapsulating the silica core is formed by adding silica precursor or precursors at temperatures below 50° C., under conditions such that formation of new silica nanoparticles is not observed. The core-shell nanoparticles are then exposed to a temperature of 50 to 100° C. over a period of at least 12 hours and/or pressure of at least 1.1 atmospheres. The core-shell silica nanoparticles so treated exhibit a density of at least 1.4 g/cm³.

In one embodiment, during formation of the shell the precursors are added in the form of serial aliquots at a temperature of from 20 to 23° C., wherein the time between addition of consecutive serial aliquots is at least 15 minutes. In one embodiment, the serial aliquots are added over a period of at least six hours. In one embodiment, the number of serial aliquots is at least 23.

In one embodiment, the present invention provides core-shell silica nanoparticles prepared according to the methods disclosed herein.

In another aspect, the present invention provides core-shell nanoparticles having a core of silica and a light-emitting material (e.g., a fluorescent or phosphorescent material) and/or a light-absorbing material, wherein the light-emitting material and/or light absorbing material is covalently bound to the silica network of the core. The longest dimension of the core can be from 5 to 500 nm. The shell comprises silica. The longest dimension of the core-shell nanoparticle can be from 5 to 500 nm. The density of the core-shell nanoparticle can be at least 1.4 g/cm³.

In one embodiment, the density of the core-shell nanoparticle can be from 1.4 to 2.1 g/cm³. In another embodiment, the light-material can be a fluorescent dye (e.g., ADS832WS and tetramethyl rhodamine isothiocyanate (TRITC)) or semiconductor nanocrystal.

BRIEF DESCRIPTION OF THE DRAWINGS

FIG. 5. An example of a plot that can be used to calculate the conversion from the ratio between the peaks at 836 nm and 760 nm to the percentage of water that the dyes within the particles are surrounded by.

DETAILED DESCRIPTION OF THE INVENTION

The present invention provides core-shell silica nanoparticles and a method of making the same. The core-shell nanoparticles of the present invention comprise a core and a shell.

The core comprises silica and a light-absorbing and/or photoluminescent (light emitting) material.

Some unique features of the present invention include, but are not limited to: i.) core-shell nanoparticles may be made with a densified shell by the application of heat to the reaction either during initial synthesis or after initial synthesis; ii.) core-shell nanoparticles may be either entirely formed at temperatures above room temperature, the cores may be formed at elevated temperatures or the shells may be formed at elevated temperatures; iii.) silica nanoparticles or parts (e.g., core and shell) thereof have high density and low porosity, and, therefore, it is expected that the passage of solvents through the silica matrix and pores within it will decrease, which, in turn, results in enhanced photophysical properties, including the brightness of the particle fluorescence; and iv.) the core-shell nanoparticles may incorporate molecules or inorganic materials that absorb light, fluoresce, phosphoresce or a combination thereof.

The core of the core-shell nanoparticle comprises silica and a photoluminescent (light emitting) and/or a light-absorbing material. In one embodiment, the core is independently synthesized using known sol-gel chemistry, e.g., by hydrolysis of a silica precursor or precursors. The silica precursors are present as a mixture of a silica precursor and a silica precursor conjugated, e.g. linked by a covalent bond, to a light absorbing and/or photoluminescent (light emitting) (referred to herein as a "conjugated silica precursor"). The hydrolysis can be carried out under alkaline (basic) or acidic conditions. For example, the hydrolysis can be carried out by addition of ammonium hydroxide to the mixture comprising silica precursor and conjugated silica precursor.

Silica precursors are compounds which under hydrolysis conditions can form silica. Examples of silica precursors include, but are not limited to, organosilanes such as, for example, tetraethoxysilane (TEOS), tetramethoxysilane (TMOS) and the like.

The silica precursor used to form the conjugated silica precursor has a functional group or groups which can react with the absorbing and/or photoluminescent (light emitting) material to form a covalent bond or bonds. Examples of such silica precursors includes, but is not limited to, isocyanatopropyltriethoxysilane (ICPTS), aminopropyltrimethoxysilane (APTS), mercaptopropyltrimethoxysilane (MPTS), and the like.

In one embodiment, an organosilane (conjugated silica precursor) used for forming the core has the general formula $R_{(4-n)}SiX_n$, where X is a hydrolyzable group such as ethoxy, methoxy, or 2-methoxy-ethoxy; R can be a monovalent organic group of from 1 to 12 carbon atoms which can optionally contain a functional organic group such as, for example, mercapto, epoxy, acrylyl, methacrylyl, and amino and the like; and n is an integer of from 0 to 4. The silica precursor conjugated to a fluorescent compound is co-condensed with silica precursors such as, for example, TEOS and TMOS to form the fluorescent core. A silane used for forming the silica shell has n equal to 4. The use of functional mono-, bis- and tris-alkoxysilanes for coupling and modification of co-reactive functional groups or hydroxy-functional surfaces, including glass surfaces, is also known, see Kirk-Othmer, Encyclopedia of Chemical Technology, Vol. 20, 3rd Ed., J. Wiley, N.Y. Although not intending to be bound by any particular theory, it is considered that the coupling arises as a result of hydrolysis of the alkoxysilane groups to silanol groups and as a result of condensation with hydroxyl groups of the surface, see E. Pluedemann, Silane Coupling Agents, Plenum Press, N.Y. 1982. Processes to synthesize core-shell nanoparticles using modified Stoeber processes can be found in U.S. patent application Ser. No. 10/306,614, filed Nov. 26, 2002, now abandoned, and Ser. No. 10/536,569, filed May 2, 2006, now U.S. Pat. No. 8,298,677, issued Oct. 30, 2012, the disclosure of such processes therein are incorporated herein by reference.

The light-absorbing or light-emitting material can be organic materials, inorganic materials, or a combination thereof. Light-absorbing materials are, for example, organic absorber dyes or pigments. Light emitting materials are, for example, organic fluorophores/dyes or semiconductor nanocrystals.

Examples of photoluminescent materials include, but are not limited to, fluorescent and phosphorescent materials. The nanoparticles can incorporate known fluorescently and/or phosphorescently responsive materials such as, for example, dyes, pigments, or combinations thereof. A wide variety of suitable chemically reactive fluorescent dyes are known, see for example MOLECULAR PROBES HANDBOOK OF FLUORESCENT PROBES AND RESEARCH CHEMICALS, $6^{th}$ ed., R. P. Haugland, ed. (1996). A typical fluorophore is, for example, a fluorescent aromatic or heteroaromatic compound such as is a pyrene, an anthracene, a naphthalene, an acridine, a stilbene, an indole or benzindole, an oxazole or benzoxazole, a thiazole or benzothiazole, a 4-amino-7-nitrobenz-2-oxa-1,3-diazole (NBD), a cyanine, a carbocyanine, a carbostyryl, a porphyrin, a salicylate, an anthranilate, an azulene, a perylene, a pyridine, a quinoline, a coumarin (including hydroxycoumarins and aminocoumarins and fluorinated derivatives thereof), and like compounds, see for example U.S. Pat. Nos. 5,830,912; 4,774,339; 5,187,288; 5,248,782; 5,274,113; 5,433,896; 4,810,636; and 4,812,409. Fluorescent materials with emission in the range of, for example, 300 to 900 nm can be used.

The ratio of silica to light-emitting and/or light-absorbing materials can be in the range of 1:50 to 1:2000 (mass ratio of material to silica as determined by the total mass of dye and total mass of particles after the reaction forming the nanoparticles), including all ratios therebetween. Some representative ratios include 1:100, 1:200, 1:300, 1:400, 1:500, 1:1000 and 1:1500.

The diameter of the core-shell nanoparticle can be, for example, from about 1 to about 1,000 nanometers, including all integers and ranges from 1 to 1,000. In various embodiments, the diameter of the core-shell nanoparticles is 1 to 100 nm, 1 to 50 nm and 1 to 10 nm. In various embodiments the diameter of the core can be, for example, from about 1 to about 300 nanometers, including all integers and ranges between 1 and 300, and from about 2 to about 200 nanometers; and, the thickness of the silica shell can be, for example, from about 1 to about 300 nanometers, including all integers and ranges between 1 and 300, and about 2 to about 100 nanometers. The thickness or diameter of the core to the thickness of the silica shell can be in a ratio of, for example, from about 1:0.1 to about 1:100.

The shell is a dense silica coating on the core that can cover, for example, from about 10 to about 100 percent, including all integers therebetween, of the surface area of the core. In one embodiment, the shell encapsulates the core. In one embodiment, the shell is produced by the repeated addition and hydrolysis (in discrete steps) of silica precursor or precursors, such that silica forms on the core and nucleation of new silica nanoparticles is minimized or completely inhibited. Examples of silica shell precursors include, but are not limited to, those described above for formation of the core.

The silica shell has a density of at least 1.4 $g/cm^3$. In embodiments, the silica shell has a density of from 1.4 to 2.1 $g/cm^3$, including all values to 0.1 between 1.4 and 2.1. Without intending to be bound by any particular theory, it is expected that the increased density of the silica shell results in greater stability of and increased light emission/light-absorption from the core-shell nanoparticles.

In one embodiment, core-shell nanoparticles of the present invention exhibit absorption and/or emission of electromagnetic radiation having a wavelengths in the range of 300 to 900 nm, including all integers and ranges therebetween.

In one embodiment, core-shell nanoparticles of the present invention exhibit an improvement in emission brightness of at least 10%. In various embodiments, the brightness improvement is from 5% to 50%, including all integers therebetween.

In one embodiment, the core-shell nanoparticles exhibit increased photostability. Without intending to be bound by any particular theory, it is expected that the increased photostability results from a decrease in the diffusion of chemical species through the shell of the nanoparticle due at least in part to the increased density of the shell. In one embodiment, the photostability is increased by at least 10%. In various embodiments, the photostability improvement is from 5% to 50%, including all integers therebetween.

By increased brightness and photostability it is meant that the brightness and/or photostability of the core-shell nanoparticles is increased relative to the particles of substantially the same composition prepared by conventional means, such as, for example, those described in U.S. patent application Ser. No. 11/119,969, filed May 2, 2005, now U.S. Pat. No. 8,084,001, issued Dec. 27, 2011, (which particles are referred to as Cornell Dots).

The present invention provides a method for producing core-shell silica nanoparticles with dense silica shells. In one embodiment, the steps of the method include: a.) preparing a silica core by combining a silica precursor or silica precursors and a light-emitting material, wherein the material is fluorescent, phosphorescent, and/or light-absorbing material covalently bound to organically modified silica precursor or silica precursors under conditions such that the silica precursors are hydrolyzed resulting in formation of a silica core, and b.) forming a silica shell by sequentially adding aliquots of silica precursor at elevated temperature and hydrolyzing the silica precursor. The light-absorbing material, light-emitting material and/or light reflecting material is covalently linked to the silica network comprising the core. For example, at least 10 serial aliquots of silica precursor at a temperature of at least 50° C. are sequentially added to the cores over a period of between 1 and 24 hours, and the time between additions of the aliquots is at least 6 minutes. The core-shell silica nanoparticles exhibit improved brightness and stability relative to particles known in the art.

In one embodiment, the cores are prepared by hydrolysis of the silica and conjugated silica precursor(s) at temperatures described above for formation of the silica shell, resulting in an improved density of the core.

In another embodiment, the steps of the method include: a.) preparing a silica core by combining a silica precursor or silica precursors and a light-emitting material, wherein the material is fluorescent, phosphorescent, and/or light-absorbing material covalently bound to organically modified silica precursor or silica precursors under conditions such that the silica precursors are hydrolyzed resulting in formation of a silica core, wherein the light emitting material and/or light reflecting material is sequestered within the silica; b) forming a silica shell encapsulating the silica core by sequentially adding aliquots of silica precursor at room temperature and hydrolyzing the silica precursor to form a layer of silica. The light-absorbing material and/or light-emitting material is sequestered within the core. The core-shell silica nanoparticles are then subjected to conditions (such as, for example, increased temperature and/or pressure) which result in an increase in the density of the silica core and/or silica shell.

It would be understood by those having skill in the art that the amount of silica precursor(s) per aliquot is dependent on the scale of the reaction.

The temperature at which the shell is formed is, as least in part, limited by the solvent(s) used to carry out the reaction. By using a solvent system comprising solvent(s) with high boiling points, such as for example, up to 100° C., it is expected that shells and/or cores with increased density (e.g., approaching 2 g/cc) can be formed. In one embodiment, the temperature of addition/hydrolysis is 50° C. to 100° C., including all integers and ranges therebetween. It would be understood by those having skill in the art that the temperature of addition/hydrolysis is limited by the solvent used in the reaction and thus, the boiling point of the solvent dictates the upper limit for the temperature of addition/hydrolysis. If solvents with sufficiently high boiling points are used in the reaction the temperature of addition/hydrolysis can be greater and it is expected that the resulting core-shell nanoparticles will exhibit improved properties (e.g., brightness and/or density).

The time interval between addition/hydrolysis and/or temperature of addition/hydrolysis steps is chosen such new nucleation of pure silica nanoparticles is minimized or eliminated. It is desirable that no nucleation of pure silica nanoparticles is observed.

For example, at least 23 aliquots of silica precursor at a temperature of 20 to 23° C. (i.e., room temperature) are sequentially added to the cores over a period of at least 6 hours, and the time between additions of the aliquots is at least 15 minutes. The core-shell silica nanoparticles are then subjected to a temperature of 50° C. to 100° C. over a period of at least 12 hours and/or pressure of 1.1 or higher atmospheres. It is expected that by using sufficient pressure, the silica sol gel can collapse on itself, thus creating a core and/or shell with very high density. The density of the silica shell after exposure to the increased temperature and/or pressure is at least 0.9 g/cm$^3$.

Figure 8:
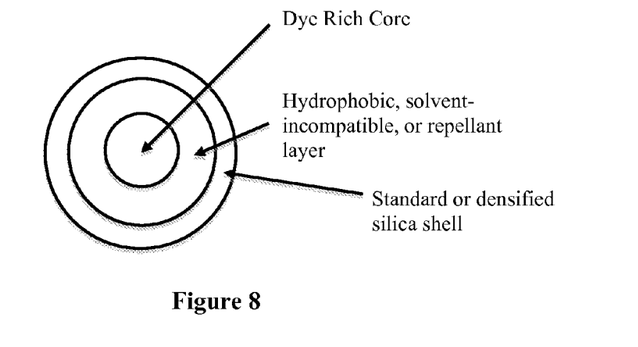
FIG. 8. A schematic representation of an alternative embodiment of the core-shell nanoparticles.

In another embodiment, a decrease in the diffusion rate of water or other molecules through the silica (e.g., silica formed using sol-gel chemistry) that constitutes the matrix of the nanoparticles can be achieved by methods such as, for example, increasing the reaction pressure or a post-reaction increase in temperature and/or pressure that promotes additional bond formation within the silica and/or heat annealing the nanoparticles via high energy laser pulses. The particles behave as the densified shell particles do (see FIG. 9, densified shell 2$^{nd}$ method), so one would expect that there has been a decrease in the diffusion rate of water across the shell to achieve such behavior. In yet another embodiment, a decrease in the diffusion rate of water or other molecules through the silica that constitutes the matrix of the particles can be achieved by incorporation of a hydrophobic or solvent-incompatible or repellant layer within or upon the core-shell silica nanoparticle. An example of this embodiment is shown in FIG. 8.

The present invention provides, in one embodiment, fluorescent silica core-shell nanoparticles that have a longer shelf life and better photophysical properties, including, for example, stability and brightness. Both of these aspects are desirable for many applications where photostability over a longer period of time are important.

Additionally, the ability to tailor the density of the silica shell or otherwise control the diffusion of molecules to the dyes makes this invention important in applications of the light-absorbing and/or light-emitting and/or light-reflecting core-shell silica nanoparticles to sensing. For example, the core-shell nanoparticles of the present invention (e.g., ADS832WS dye containing absorber core-shell nanoparticles) can be used in sensor application, such as, for example, in water or moisture sensing applications. Sensor applications of core-shell nanoparticles are disclosed in U.S. patent application Ser. No. 11/119,969, filed May 2, 2005, now U.S. Pat. No. 8,084,001, issued Dec. 27, 2011, the disclosure of such sensor applications is incorporated herein by reference.

Figure 4:
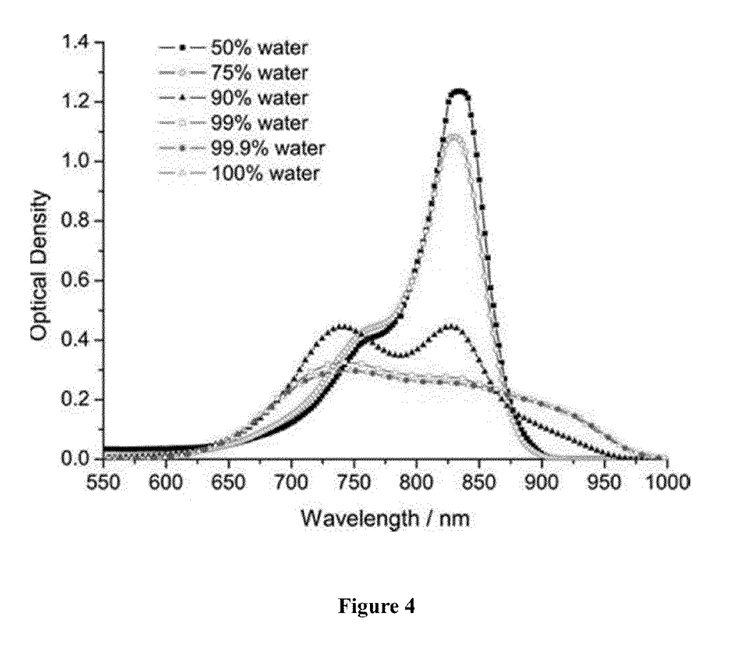
FIG. 4. Absorption spectra of ADS832WS core particles in water and water and ethanol solvent mixtures.

For example, when ADS832WS dye is in ethanol its absorption spectrum has a strong peak at ~836 nm, as shown in FIG. 4. When it is in water, its absorption spectrum shifts to ~760 nm, as shown in FIG. 4. The changes in the spectrum are continuous over the whole range of ethanol to water (the particles are produced in a majority ethanol solution, and hence, likely capture some ethanol within the structure of the particles as they are being formed) and so may be used to calibrate the particles in terms of their water content. If the particles are used in reverse, i.e., they already contain water and are placed in an ethanol or methanol rich system, they may also behave as an alcohol sensor.

The following examples are presented to illustrate the present invention. They are not intended to limiting in any manner.

Example 1

ADS832WS Containing Core-Shell Nanoparticles Synthesis/Characterization, Materials and Methods Materials For the synthesis of the core-shell nanoparticles, the following reagents were used: ethanol from Pharmo-AAPER, tetraethoxysilane (TEOS) from Fluka, ammonium hydroxide (28% NHOH in aqueous solution) from Fisher Scientific, ADS832WS dye powder from American Dye Source, dimethyl sulfoxide (DMSO) from Sigma Aldrich and 3-isocyanatopropyltriethoxysilane (ICPTS) from Gelest.

Particle Synthesis

I. Dye Preparation.

The ADS832WS dye is obtained in powdered form due to ease of handling and storage. The dye powder is dissolved using DMSO to form a 4.5 mM dye solution.

II. Dye Conjugation.

The dissolved dye molecules are conjugated with a silica precursor. In this reaction, ICPTS is mixed with the dye solution in a 50:1 molar ratio of precursor to dye.

III. Core Synthesis.

First, 15.58M of ethanol is added to a flask and stirred. Then, $1.66 \times 10^{-5}$M of conjugated ADS832WS dye solution is added to the mixture, followed by $2.93 \times 10^{-4}$M of $NH_4OH$ and $1.98 \times 10^{-4}$M of TEOS. The resulting mixture is stirred for 12 hours.

IV. Shell Addition.

The solution containing the cores is divided into two smaller samples of equal volume. To one sample, a "normal" shell is synthesized by adding $5.14 \times 10^{-5}$M of TEOS in 41 equal increments at intervals of 15 minutes at room temperature, using an Eppendorf automatic dispenser. To the other sample, a "densified" shell is synthesized by adding $7.65 \times 10^{-5}$M TEOS in 61 equal increments at intervals of 15 minutes in a silicone oil bath set at 50° C.

The following is an example of a 100 mL synthesis reaction. The ADS832WS dye powder is first dissolved by mixing 0.01882 g powder with 4.463 mL DMSO. From this dye solution, 400 μL of solution is conjugated with 22.5 μL of ICPTS and the mixture is stirred for 24 hours. The cores are synthesized by mixing 91.0 mL of ethanol, 369 μL of conjugated dye solution, 4.082 mL of aqueous $NH_4OH$, and 4.425 mL of TEOS. The resulting mixture is stirred for 12 hours.

The 100 mL reaction is split into two 50 mL samples. For one of the samples, the normal shell is synthesized by adding 574 μL of TEOS in 41 increments of 14 μL at 15 min intervals at room temperature. For the other sample, the densified shell is synthesized by adding 854 μL of TEOS in 61 increments of 14 μL at 15 min intervals in a silicone oil bath set at 50° C.

Physical Particle Evaluation.

Figure 1:
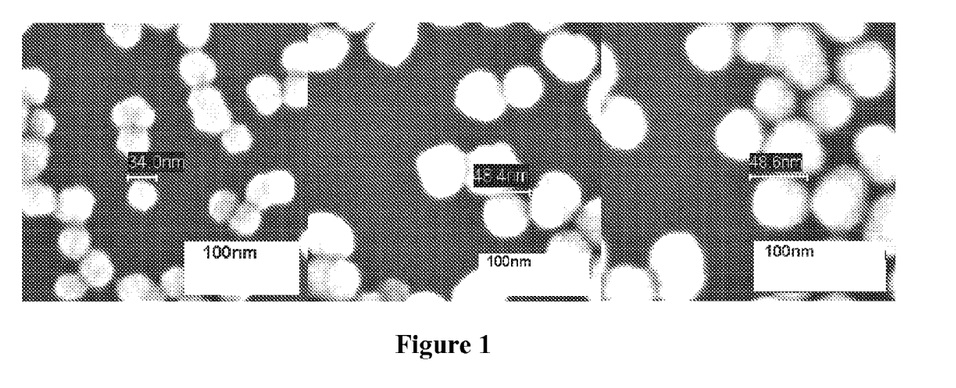
FIG. 1. A SEM image of ADS832WS core nanoparticles, left; normal shell particles, center; and densified shell particles, right.
Figure 2:
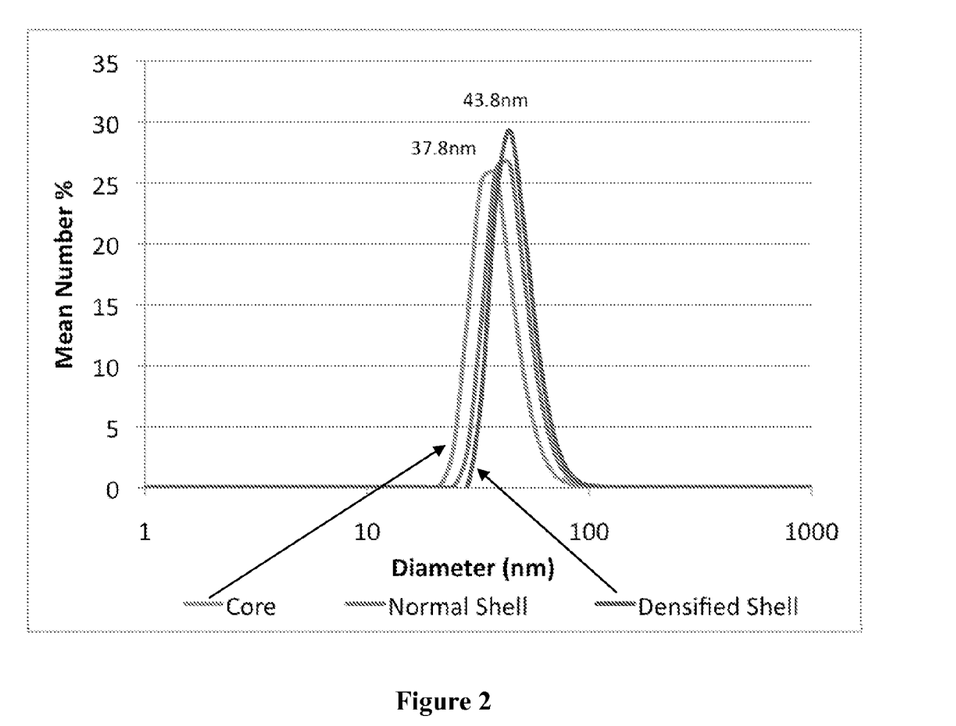
FIG. 2. Graphical representation of hydrodynamic diameters of the core, shell and densified shell ADS832WS particles obtained via dynamic light scattering.

Scanning electron microscopy (SEM) and dynamic light scattering were performed to determine particle size and size distribution. Scanning electron microscopy was performed on a LEO 1550 FE-SEM with 1.0 kV accelerating voltage to minimize sample degradation during imaging. Dilute dialyzed samples in ethanol (to promote fast drying) were dispersed on a piece of silicon wafer and allowed to dry, then vacuum dried for at least 1 hour before imaging. Dialyzed particles were diluted at least 1:10 with ethanol for dynamic light scattering measurements on a Malvern Zetasizer Nano-ZS instrument. SEM images in FIG. 1, indicate particle sizes and narrow particle dispersity of a core, normal and densified shell particle series. The dynamic light scattering mean number percent plot, in FIG. 2, indicates the core, normal and densified shell particle sizes. Note that the normal and densified shell particles were built on the same cores as those shown, indicating that for this example, the shell thickness was between 3 and 7 nm (when the SEM and dynamic light scattering data are taken together).

Absorption Measurements.

In order to quantify the effect of shell densification on the photophysical properties of the particles, absorption and fluorescence measurements were taken and analyzed. For the absorption of the particles in water, 1 mL of particle sample is spun in an Eppendorf 5415R centrifuge at 13,200 rpm for 10 minutes to concentrate the particles into a pellet. The supernatant is removed and replaced with 1 mL of water. The sample is then sonicated with a Sonics VibraCell probe sonicator for 30 seconds to resuspend the particles in water. This solution is then measured for absorption using a Cary 5000 UV-Vis-NIR spectrophotometer from Varian at preset time intervals (2 minute intervals for the first 20 minutes and 20 minute intervals for 12 hours).

Fluorescence Measurements.

Fluorescence measurements were conducted on a new set of cores and particles that encapsulate the fluorescent dye tetramethyl rhodamine isothiocyanate (TRITC). The cores and particles are synthesized using the same method as mentioned above, including the addition of normal and densified shells. In this case the dye is conjugated using 3-aminopropyltriethoxysilane. The particle sets, along with a free TRITC dye sample, are absorption matched to the same optical density to accurately compare their fluorescence intensity. These absorption matched particle sets and the free dye are then excited with a xenon arc lamp, wavelength selected with a diffraction grating for 550 nm and a fluorescence spectrum of each set was taken with a Photon Technology International spectrofluorometer.

Data Analysis.

Each set of the collected absorption data is corrected for the scattering background using MATLAB by fitting each scattering background with a sum of two exponential decay functions (which results in correlation coefficients of R>0.99, and when compared to a stretched exponential does not produce statistically different results). For each dataset, a ratio of the optical density of the primary peak at 836 nm and the secondary peak at 760 nm is calculated. The ratios are plotted against the time that the particles are exposed to water.

The fluorescence data obtained is plotted against wavelength with all four data sets (free dye, cores, normal shell particles, densified shell particles) on the same axes to establish a clear comparison.

Results.

Figure 3:
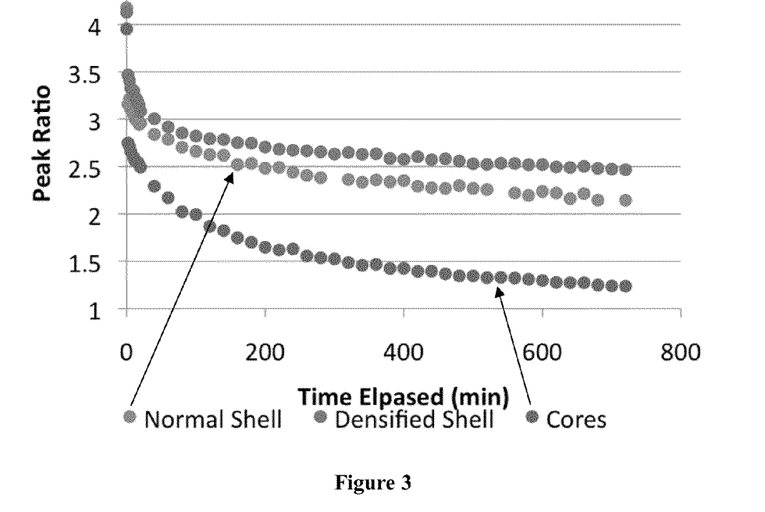
FIG. 3. Graphical representation of time versus absorption ratio of the 836 to 760 nm peak for cores, normal shell and densified shell particles.
Figure 5:
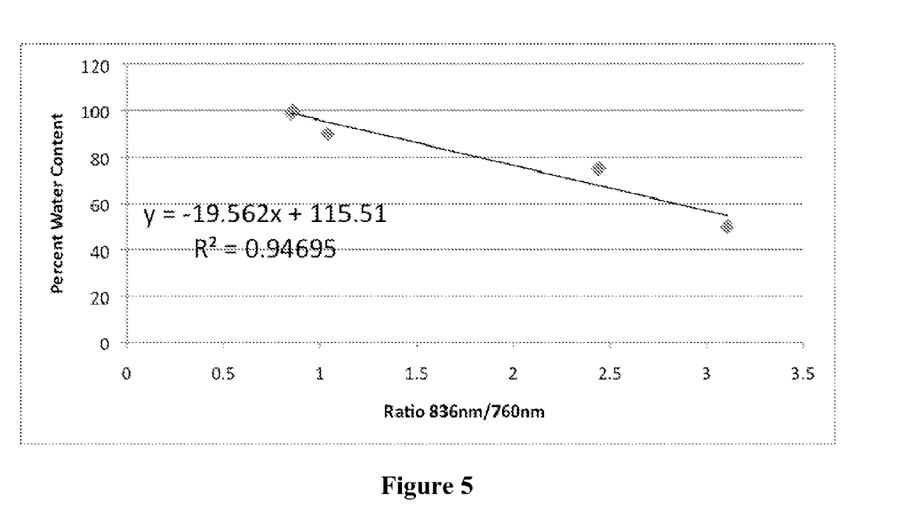

The result of these measurements and calculations for the cores, normal and densified shells is shown in FIG. 3. The results indicate strong protection by the silica matrix when the ADS832WS dyes are encapsulated and further protection by the normal shell. Adding a densified shell around the same core provides the largest enhancement in protection. The protection can be manifested as, for example, a decrease in diffusion across the silica shell. The ratio data in FIG. 3 may be converted to a percentage of water surrounding the dye using the plots in FIG. 4 and the corresponding equation from the fit in FIG. 5.

Figure 6:
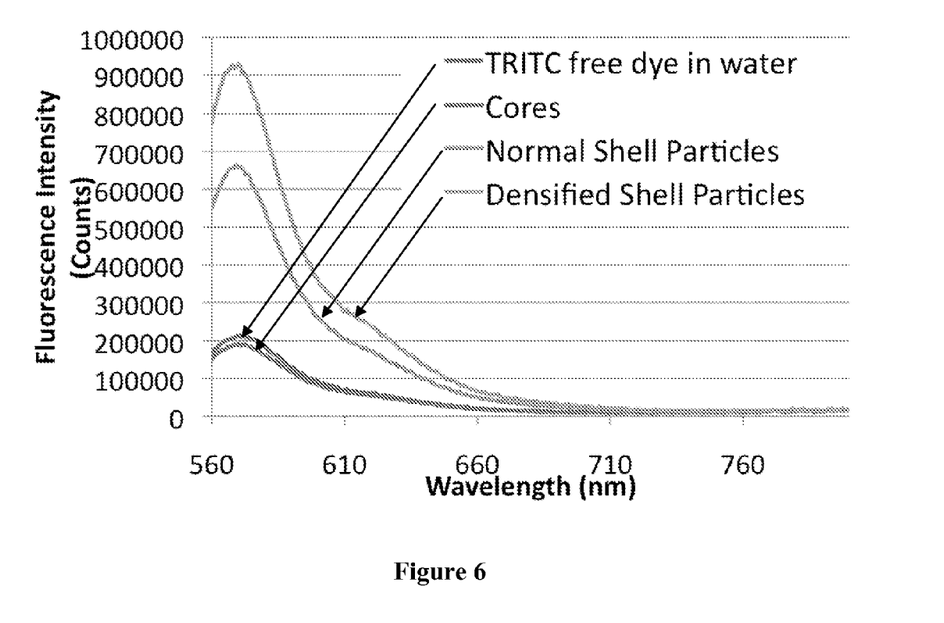
FIG. 6. Graphical representation of fluorescence intensity versus wavelength for free TRITC dye, cores, normal shell particles and densified shell particles.

For the TRITC dye containing silica nanoparticles, the samples were absorption matched at the peak absorption of ~550 nm and fluorescence was collected from absorption matched samples under identical conditions. The fluorescence plot is shown in FIG. 6. The normal shell particles show a marked increase in brightness from the cores and free dye, while the densified shell particles show an even greater (greater than 50%) enhancement in brightness.

Example 2

In this example, heat and pressure are applied after the production of the C dot reaction (which produces a core-shell silica nanoparticle) in a Parr-Bomb apparatus. In this example, no additional silica is needed to grow a densified shell, but rather the decrease in the diffusion rate of water across the silica shell shows that the same result is achieved by applying heat or pressure to a preformed particle.

Figure 9:
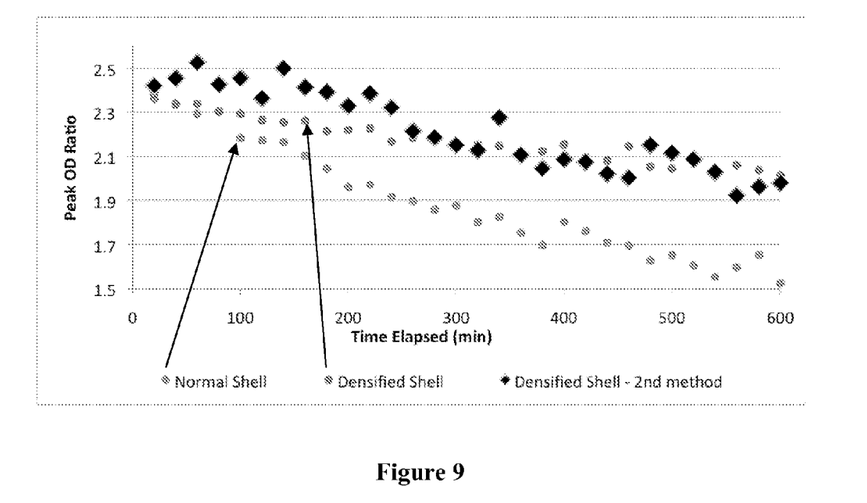
FIG. 9: A plot of peak ratio versus time for normal, densified, and pressure densified silica nanoparticles containing ADS832WS.

Densification is achieved by taking 15 mL of as made fluorescent silica nanoparticles in a 20 mL Parr-Bomb, heating to 60 degrees Celsius and holding the temperature overnight. This increased temperature elevates the internal pressure (approximately 1.125 atmospheres). Furthermore, this increased pressure promotes additional bonds to form within the silica, leading to higher cross-linking and higher particle density. Temperature and duration may be varied to control the density of the particles. FIG. 9 shows a comparison of normal shell particles, densified shell particles and normal shell particles post-synthesis processed using the above described method (densified shell—$2^{nd}$ method in the plot). In this plot of preliminary data, one can see clearly that the pressure densified particles behave similarly to the densified shell particles, without the need for additional silica, just the application of ~12 hours of elevated pressure and temperature.

Example 2

Figure 7:
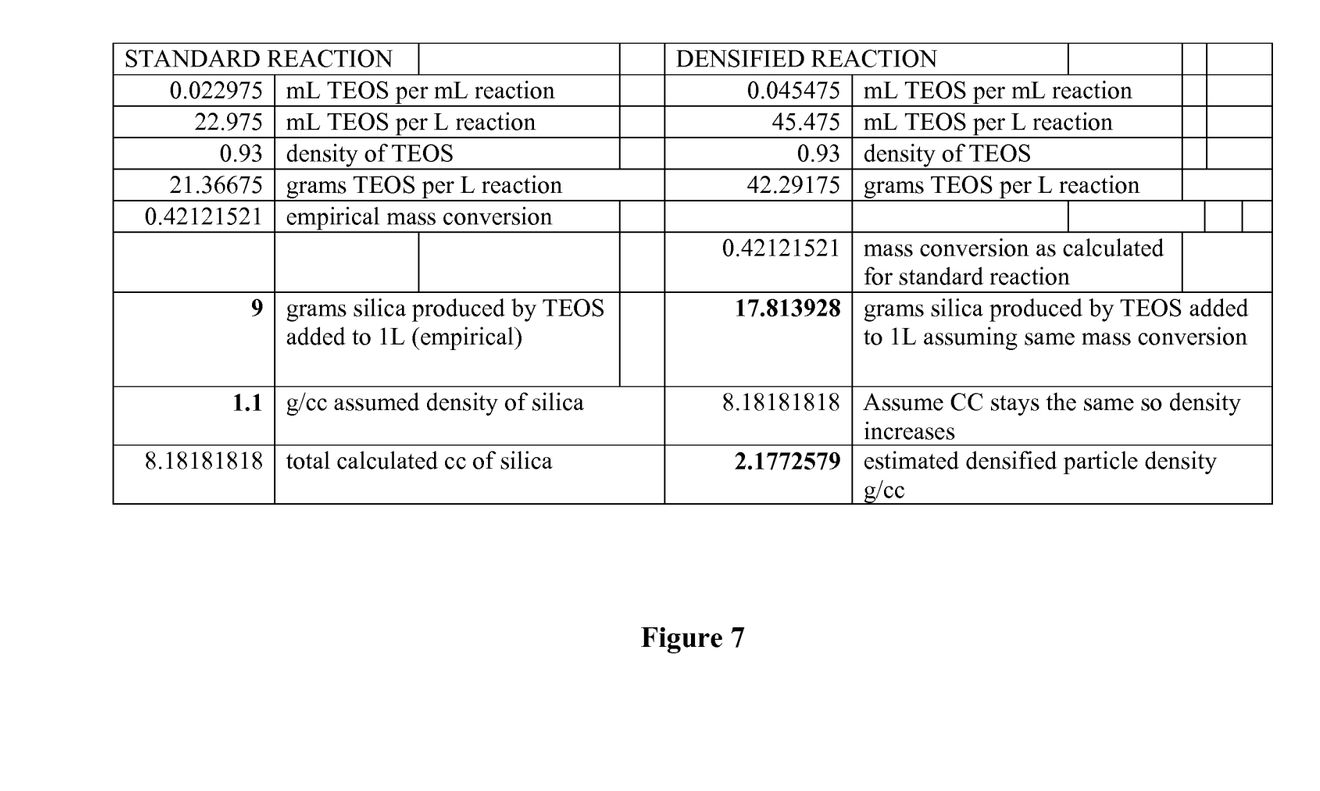
FIG. 7. An example of calculation of core-shell nanoparticle density.

An example of the calculations used to determine the density of the core-shell nanoparticles of the present invention is shown in FIG. 7. The range for the resulting silica shell density is from 2 to 2.5 g/cc. Based on Brinker's Sol Gel Science book page 583 where borosilicate (different silica composition) gel densities go down to 0.9 g/cc, our particles (when made large enough) settle out of water, so their density is greater than 1 g/cc. The example calculation use a starting density of 1.1 g/cc, but the viable range goes to 2 g/cc.

While the invention has been particularly shown and described with reference to specific embodiments (some of which are preferred embodiments), it should be understood by those having skill in the art that various changes in form and detail may be made therein without departing from the spirit and scope of the present invention as disclosed herein.

What is claimed is:

1. A method for producing core-shell silica nanoparticles comprising the steps of:
    a) preparing a silica core by combining a silica precursor and a silica precursor covalently bound to a light-absorbing material and/or light-emitting fluorescent or phosphorescent material, under conditions such that the silica precursors are hydrolyzed resulting in formation of a silica core, wherein the light-emitting material and/or light-absorbing material is covalently bound to the silica network of the core; and
    b) forming a silica shell encapsulating the silica core by adding a silica precursor at a temperature of at least 50° C., under conditions such that formation of new silica nanoparticles is not observed.

2. The method of claim 1, wherein the core-shell silica nanoparticles exhibit a density of at least 1.4 g/cm$^3$.

3. The method of claim 1, wherein the silica precursor is TEOS and/or TMOS.

4. The method of claim 1, wherein the ratio of mass of light-absorbing material and/or light-emitting material to mass of silica is from 1 to 50 to 1 to 2000.

5. The method of claim 1, wherein in step b) the silica precursors are added in the form of at least 10 aliquots of silica precursor at a temperature of at least 50° C. over a period of at least 1 hour, wherein the time between addition of the aliquots is at least 6 minutes.

6. The method of claim 1, wherein step b) is carried out at a temperature of from 50 to 100° C.

7. The method of claim 1, wherein the silica core has a diameter of from 1 to 300 nanometers.

8. The method of claim 1, wherein the silica shell has a thickness of from 1 to 300 nanometers.

9. The method of claim 1, wherein the core-shell silica nanoparticle has a diameter of from 1 to 1000 nanometers.

* * * * *